United States Patent
Li et al.

(10) Patent No.: US 11,522,587 B2
(45) Date of Patent: Dec. 6, 2022

(54) METHOD AND DEVICE FOR CHANNEL STATE INFORMATION FEEDBACK

(71) Applicant: Telefonaktiebolaget LM Ericsson (publ), Stockholm (SE)

(72) Inventors: Gen Li, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 38 days.

(21) Appl. No.: 17/266,021

(22) PCT Filed: Jul. 15, 2019

(86) PCT No.: PCT/SE2019/050694
§ 371 (c)(1),
(2) Date: Feb. 4, 2021

(87) PCT Pub. No.: WO2020/032856
PCT Pub. Date: Feb. 13, 2020

(65) Prior Publication Data
US 2021/0297123 A1    Sep. 23, 2021

(30) Foreign Application Priority Data
Aug. 8, 2018   (WO) ................ PCT/CN2018/099366

(51) Int. Cl.
*H04B 7/06* (2006.01)
*H04B 7/0456* (2017.01)
(Continued)

(52) U.S. Cl.
CPC ......... *H04B 7/0486* (2013.01); *H04B 7/0626* (2013.01); *H04B 17/336* (2015.01); *H04L 5/0051* (2013.01)

(58) Field of Classification Search
CPC .. H04B 7/0486; H04B 7/0626; H04B 17/336; H04B 7/086; H04B 7/063; H04B 7/0617; H04L 5/0051
See application file for complete search history.

(56) References Cited

U.S. PATENT DOCUMENTS

2013/0114425 A1   5/2013  Sayana et al.
2013/0195161 A1   8/2013  Hammarwall et al.
(Continued)

OTHER PUBLICATIONS

EPO Communication and Supplementary European Search Report and Written Opinion dated Apr. 8, 2022 for Patent Application No. 19846962.9, consisting of 11-pages.
(Continued)

*Primary Examiner* — Minh Trang T Nguyen
(74) *Attorney, Agent, or Firm* — Christopher & Weisberg, P.A.

(57) ABSTRACT

The present disclosure provides a method in a terminal device for Channel State Information, CSI, feedback. The method includes: determining, for each of a plurality of candidate ranks, a power offset between a CSI Reference Signal, CSI-RS, and a downlink data transmission; calculating, for each of the plurality of candidate ranks, a Signal-to-Noise Ratio, SNR, of the downlink data transmission based on the power offset determined for the corresponding candidate rank; selecting a rank from the plurality of candidate ranks based on the respective SNRs calculated for the plurality of candidate ranks; and transmitting a Rank Indicator, RI, indicating the selected rank to a network device.

18 Claims, 6 Drawing Sheets

(51) Int. Cl.
*H04B 17/336* (2015.01)
*H04L 5/00* (2006.01)

(56) References Cited

U.S. PATENT DOCUMENTS

| | | |
|---|---|---|
| 2013/0301432 A1 | 11/2013 | Hammarwall et al. |
| 2014/0086166 A1 | 3/2014 | Lindbom et al. |
| 2015/0156779 A1 | 6/2015 | Lee et al. |
| 2017/0195029 A1 | 7/2017 | Nammi et al. |
| 2018/0115444 A1 | 4/2018 | Lee et al. |
| 2018/0376429 A1* | 12/2018 | Islam ................ H04W 74/0833 |

OTHER PUBLICATIONS

International Search Report and Written Opinion dated Nov. 18, 2019 for International Application No. PCT/SE2019/050694 filed Jul. 15, 2018, consisting of 12-pages.
TSG-RAN WG1 #62bis R1-105324; Title: Enhanced power measurement offset for MU-MIMO; Source: Ericsson, ST-Ericsson; Agenda Item: 6.3.2.1; Document for: Discussion & Decision; Date and Location: Oct. 11-15, 2010, Xi'an, China, consisting of 4-pages.

* cited by examiner

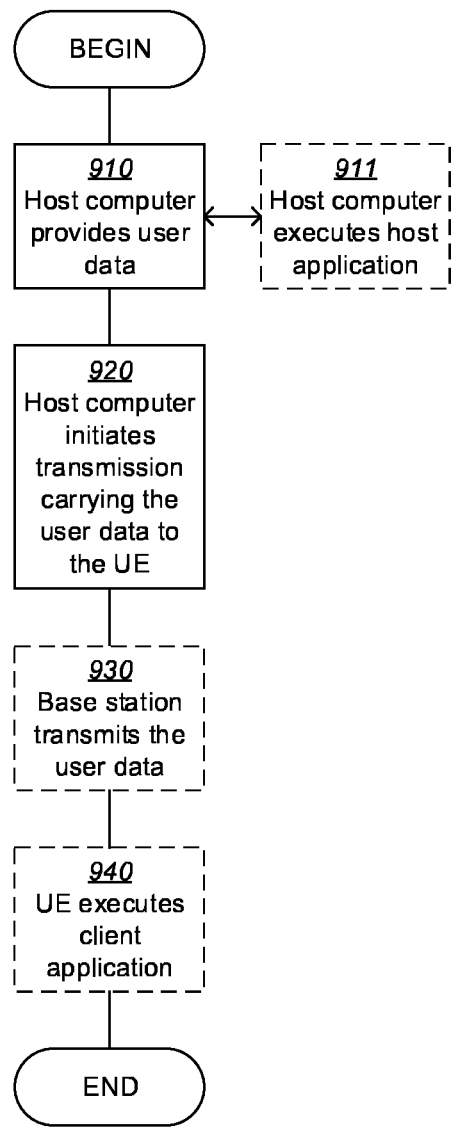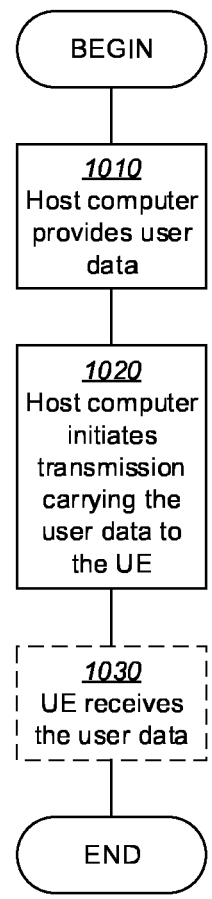
FIG. 9
FIG. 10

METHOD AND DEVICE FOR CHANNEL STATE INFORMATION FEEDBACK

CROSS-REFERENCE TO RELATED APPLICATIONS

This application is a Submission Under 35 U.S.C. § 371 for U.S. National Stage Patent Application of International Application No.: PCT/SE2019/050694, filed Jul. 15, 2019 entitled "METHOD AND DEVICE FOR CHANNEL STATE INFORMATION FEEDBACK," which claims priority to International Application No.: PCT/CN2018/099366, filed Aug. 8, 2018, the entireties of both of which are incorporated herein by reference.

TECHNICAL FIELD

The present disclosure relates to wireless communication, and more particularly, to methods and devices for Channel State Information (CSI) feedback.

BACKGROUND

In a closed-loop Long Term Evolution (LTE) or New Radio (NR) system, a terminal device (e.g., User Equipment (UE)) needs to feedback CSI to assist a network device (e.g., evolved NodeB (eNB) or gNB) in downlink scheduling. The CSI may include one or more of a Rank Indicator (RI), a Precoding Matrix Indicator (PMI), a Channel Quality Indicator (CQI) and an Acknowledgement/Negative Acknowledgement (ACK/NACK). Based on the CSI feedback, the eNB or gNB can adjust a transmission mode, a precoding matrix, a modulation scheme and so on, for achieving higher channel capacity. An RI indicates a proper number of spatial layers, a PMI is used for determining an optimal precoding matrix and a CQI indicates the highest data rate while satisfying a predefined Block Error Rate (BLER). The feedback of the RI, PMI and CQI can be either periodic or aperiodic. The periodic feedback can be carried by Physical Uplink Control Channel (PUCCH) or Physical Uplink Shared Channel (PUSCH), while the aperiodic feedback can be carried by PUSCH. Unlike the PMI and CQI, the RI is applied to the entire bandwidth as it is relatively stable.

In NR licensed bands, a CSI Reference Signal (CSI-RS) is transmitted from a gNB to a UE for use by the UE in calculating an RI. For example, the RI can be determined based on a Signal-to-Noise Ratio (SNR) of the CSI-RS. As an example, for a two-antenna configuration, an SNR threshold can be predefined and the RI can be 2 when the SNR is higher than the SNR threshold, or otherwise the RI can be 1. In the licensed bands, the transmission power per Physical Resource Block (PRB) is constant for all possible transmission ranks, so the transmission power of the CSI-RS can be the same as the PDSCH transmission power.

However, in unlicensed bands, there is an Effective Isotropic Radiated Power (EIRP) limit to allow coexistence of multiple radio access technologies or operators. For example, the EIRP limit at 5 GHz for different regions are summarized in Table 1 below:

TABLE 1

| | EIRP Limit at 5 GHz | | | |
|---|---|---|---|---|
| | 5150-5250 MHz | 5250-5350 MHz | 5470-5725 MHz | 5725-5825 MHz |
| Europe | 23 dBm | 23 dBm(Note 1) | 30 dBm(Note 1) | No Allocation |
| US(Note 2) | 36 dBm | 30 dBm(Note 1) | 30 dBm(Note 1) | 36 dBm |
| China | 23 dBm | 23 dBm(Note 1) | No Allocation | 33 dBm |

(Note 1) EIRP limit reduced by 3 dB if without Transmit Power Control (TPC)
(Note 2) Radio Frequency (RF) output power limit exists in US regulation, i.e. 6 dB less compared to EIRP limit The EIRP limit is a product of a transmitter power and an antenna gain in a given direction relative to an isotropic antenna of a radio transmitter. In a Multiple Input Multiple Output (MIMO) case, the following equation should be met:

$$\text{Total transmission power (dBm)} + \text{Antenna gain (dB)} + \text{Beamforming gain (dB)} < \text{EIRP limit}. \quad (1)$$

The beamforming gain will be different for different ranks, e.g., the beamforming gain can equal to $10*\log$ (Number of Antennas/rank). For instance, assuming that there are two antenna panels and each antenna panel has a number, N, of antenna elements, the beamforming gain for a single-layer transmission can be $10*\log(2N)$ as two antenna panels are used for one layer of transmission, while the beamforming gain for a dual-layer transmission can be $10*\log(N)$ as one antenna panel is used for one layer of transmission. In this case, the beamforming gain for the dual-layer transmission is 3 dB lower than the single-layer transmission.

To improve link quality and system throughput, it is desired to use the maximum allowed transmission power in any case. Therefore, when a transmitter changes its MIMO transmission scheme (e.g., number of layers of transmissions), its total transmission power can be adapted to meet the EIRP limit.

As discussed above, a UE may determine the RI based on the SNR of the CSI-RS. In this case, the CSI-RS can only be transmitted at one fixed power, e.g., the maximum allowed power in unlicensed bands (e.g., 23 dBm) with no beamforming gain. However, the PDSCH transmission power may be different for different ranks in order to meet the EIRP limit. That is, the UE may calculate an incorrect SNR of the PDSCH transmission power and, in turn, determine an improper or suboptimal RI (and possibly CQI) for feedback to the gNB. For example, the UE may select an unnecessarily low rank when a higher rank could be used at higher transmission power.

SUMMARY

It is an object of the present disclosure to provide methods and devices for CSI feedback, capable of improving at least the feedback of RI when a transmission power limit, such as the EIRP limit, is applied.

According to a first aspect of the present disclosure, a method in a terminal device for CSI feedback is provided. The method includes: determining, for each of a plurality of candidate ranks, a power offset between a CSI-RS and a downlink data transmission; calculating, for each of the plurality of candidate ranks, an SNR of the downlink data transmission based on the power offset determined for the corresponding candidate rank; selecting a rank from the plurality of candidate ranks based on the respective SNRs calculated for the plurality of candidate ranks; and transmitting an RI indicating the selected rank to a network device.

In an embodiment, the method can further include: receiving from the network device an indication of the respective power offsets for the plurality of candidate ranks. The power offset for each of the plurality of candidate ranks can be determined from the indication.

In an embodiment, the method can further include: receiving from the network device an indication of a first power offset between a CSI-RS and a downlink data transmission for one of the plurality of candidate ranks and a power offset adjustment value. The operation of determining can include: determining the power offset for each of the plurality of candidate ranks based on the first power offset and the power offset adjustment value.

In an embodiment, the operation of determining can include: estimating a beamforming gain for each of the plurality of candidate ranks; and determining the power offset for each of the plurality of candidate ranks based on the beamforming gain estimated for the corresponding candidate rank.

In an embodiment, the operation of selecting can include: selecting, from the plurality of candidate ranks, the highest one among the ranks for each of which the calculated SNR is higher than a predefined threshold for the corresponding rank.

In an embodiment, the respective predefined thresholds for the plurality of candidate ranks can be the same. Alternatively, the plurality of candidate ranks can include a first candidate rank and a second candidate rank higher than the first candidate rank, and the predefined threshold for the second candidate rank can be larger than the predefined threshold for the first candidate rank.

In an embodiment, the operation of selecting can include: estimating, for each of the plurality of candidate ranks, a channel capacity based on the SNR calculated for the corresponding rank; and selecting, from the plurality of candidate ranks, one rank having the highest channel capacity.

In an embodiment, the method can further include: transmitting a CQI indicating the SNR calculated for the selected rank to the network device.

According to a second aspect of the present disclosure, a terminal device is provided. The terminal device includes a transceiver, a processor and a memory. The memory includes instructions executable by the processor whereby the terminal device is operative to perform the method according to the above first aspect.

According to a third aspect of the present disclosure, a computer readable storage medium is provided. The computer readable storage medium has computer program instructions stored thereon. The computer program instructions, when executed by a processor in a terminal device, cause the terminal device to perform the method according to the above first aspect.

According to a fourth aspect of the present disclosure, a method in a network device for facilitating CSI feedback is provided. The method includes: transmitting to a terminal device an indication from which a power offset between a CSI-RS and a downlink data transmission is derivable for each of a plurality of candidate ranks; and receiving from the terminal device an RI indicating one of the plurality of candidate ranks.

In an embodiment, the indication can indicate the respective power offsets for the plurality of candidate ranks.

In an embodiment, the indication can indicate a first power offset between a CSI-RS and a downlink data transmission for one of the plurality of candidate ranks and a power offset adjustment value.

In an embodiment, the method can further include: determining a downlink data transmission power based on the RI to meet an EIRP limit.

According to a fifth aspect of the present disclosure, a network device is provided. The network device includes a transceiver, a processor and a memory. The memory includes instructions executable by the processor whereby the network device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a network device, cause the network device to perform the method according to the above fourth aspect.

With the embodiments of the present disclosure, for each of a plurality of candidate ranks, a power offset between a CSI-RS and a downlink data transmission is determined and an SNR of the downlink data transmission is calculated based on the power offset. Then, a rank is selected from the plurality of candidate ranks based on the respective SNRs calculated for the plurality of candidate ranks and transmitted to a network device. In this way, for each rank, the power offset between the CSI-RS and the downlink data transmission can be dependent on that rank. Accordingly, the power of the downlink data transmission can be calculated more accurately based on the power offset, such that an improved RI selection and feedback can be achieved, e.g., when a transmission power limit, such as the EIRP limit, is applied.

BRIEF DESCRIPTION OF THE DRAWINGS

The above and other objects, features and advantages will be more apparent from the following description of embodiments with reference to the figures, in which:

FIGS. 9 to 10 are flowcharts illustrating methods implemented in a communication system including a host computer, a base station and a user equipment.

DETAILED DESCRIPTION

Figure 1:
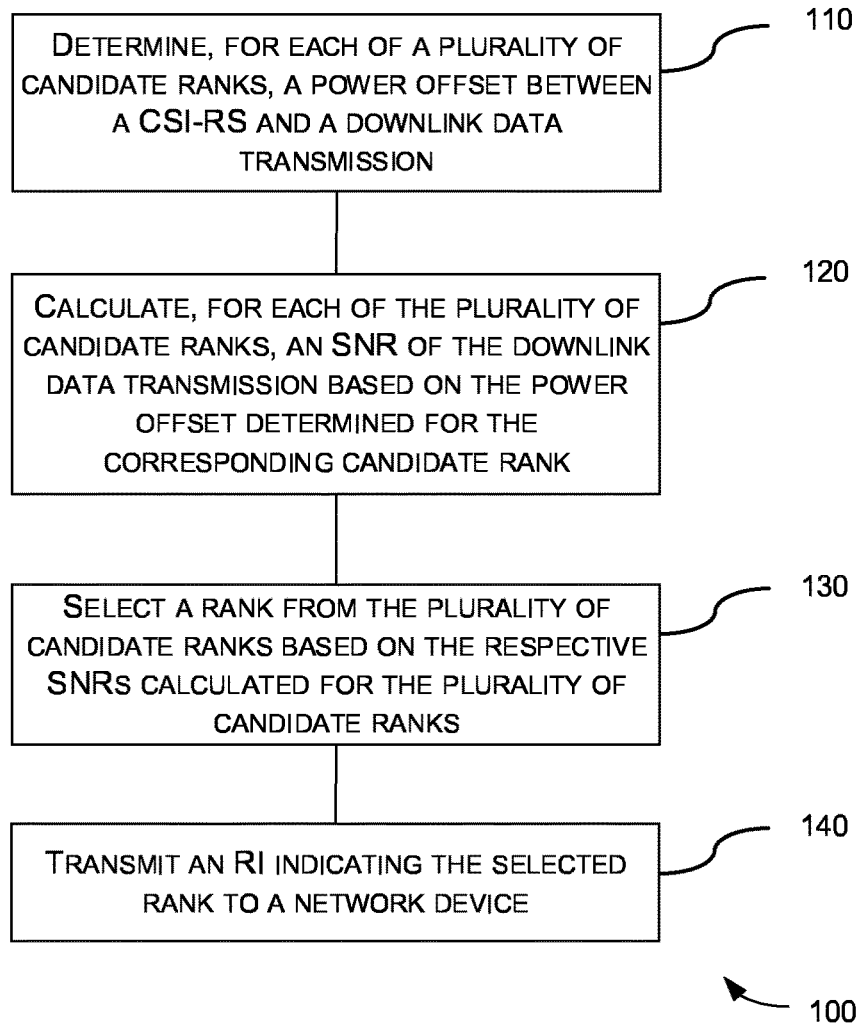
FIG. 1 is a flowchart illustrating a method in a terminal device for CSI feedback according to an embodiment of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1 G (the first generation), 2 G (the second generation), 2.5 G, 2.75 G, 3 G (the third generation), 4 G (the fourth generation), 4.5 G, 5 G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 is a flowchart illustrating a method 100 for CSI feedback according to an embodiment of the present disclosure. The method 100 can be performed at a terminal device.

At block 110, a power offset between a CSI-RS and a downlink data transmission is determined for each of a plurality of candidate ranks. For example, when a network device in communication with the terminal device is equipped with four antennas, there can be four candidate ranks: r=1, 2, 3, or 4.

Here, the terminal device can receive from the network device an indication of the respective power offsets for the plurality of candidate ranks, e.g., via Radio Resource Control (RRC) signaling. In the above example where there are four candidate ranks (r=1, 2, 3 or 4), assuming that the transmission power of the CSI-RS is the maximum allowable transmission power, which is equal to the transmission power of the downlink data transmission when r=4 (no beamforming gain is provided), the terminal device can receive from the network device an explicit indication of p(1)=−3 dB, p(2)=−2 dB, p(3)=−1 dB and p(4)=0 dB, where p(r) denotes the power offset for the candidate rank r (r=1, 2, 3 or 4). In the block 110, the power offset for each of the plurality of candidate ranks can be determined from the indication directly.

Alternatively, the terminal device can receive from the network device an indication of a first power offset between a CSI-RS and a downlink data transmission for one of the plurality of candidate ranks and a power offset adjustment value. In this case, in the block 110, the terminal device can determine the power offset for each of the plurality of candidate ranks based on the first power offset and the power offset adjustment value. In the above example where there are four candidate ranks (r=1, 2, 3 or 4) and the transmission power of the CSI-RS is equal to the transmission power of the downlink data transmission when r=4, the terminal device can receive from the network device an indication of a power offset p(4)=0 dB between the CSI-RS and the candidate rank r=4 and a power offset adjustment value Δp=1 dB. Then, the terminal device can calculate a power offset p(r) for the candidate rank r as: p(r)=p(4)+Δp*(r−4). Accordingly, in the block 110, the terminal device can determine that p(1)=−3 dB, p(2)=−2 dB, p(3)=−1 dB and p(4)=0 dB.

Alternatively, in the block 110, the terminal device can estimate a beamforming gain for each of the plurality of candidate ranks and determine the power offset for each of the plurality of candidate ranks based on the beamforming gain estimated for the corresponding candidate rank. In the above example where there are four candidate ranks (r=1, 2, 3 or 4) and the transmission power of the CSI-RS is equal to the transmission power of the downlink data transmission when r=4, the beamforming gains bg(r) for r=1, 2, 3 and 4 can be bg(1)=6 dB, bg(2)=3 dB, bg(3)=1.25 dB and bg(4)=0 dB, respectively. Accordingly the terminal device can calculate a power offset p(r) for the candidate rank r as: p(r)=p(4)−bg(r). In the block 110, the terminal device can determine that p(1)=−6 dB, p(2)=−3 dB, p(3)=−1.25 dB and p(4)=0 dB.

While in the above described examples the transmission power of the CSI-RS is assumed to be the maximum allowable transmission power, which is equal to the transmission power of the downlink data transmission when r=4, it is not necessarily the case. Rather, the transmission power of the CSI-RS can be lower than the maximum allowable transmission power.

At block 120, an SNR of the downlink data transmission is calculated for each of the plurality of candidate ranks based on the power offset determined for the corresponding candidate rank. For example, the SNR of the downlink data transmission for the candidate rank r, SNR(r), can be calculated as:

$$SNR(r) = SNR0 + p(r) \quad (2)$$

where SNR0 denotes the SNR of the CSI-RS, which can be measured at the terminal device, and p(r) denotes the power offset for the candidate rank r as determined in the block 110.

At block 130, a rank is selected from the plurality of candidate ranks based on the respective SNRs calculated for the plurality of candidate ranks.

In an example, in the block 130, the terminal device can select, from the plurality of candidate ranks, the highest one among the ranks for each of which the calculated SNR is higher than a predefined threshold for the corresponding rank. Here, the respective predefined thresholds for the plurality of candidate ranks can be the same. Alternatively, the plurality of candidate ranks may include a first candidate rank and a second candidate rank higher than the first candidate rank, and the predefined threshold for the second candidate rank is larger than the predefined threshold for the first candidate rank.

For example, Th(r) denotes the predefined threshold for the candidate rank r, the terminal device can select the highest candidate rank r that satisfies SNR(r)>Th(r). The threshold Th(r) may be the same for all candidate ranks r. Alternatively, for candidate ranks r1 and r2, Th(r1)>Th(r2) when r1>r2.

Alternatively, in the block 130, the terminal device can estimate, for each of the plurality of candidate ranks, a channel capacity based on the SNR calculated for the corresponding rank.

For example, the terminal device can estimate the channel capacity for each candidate rank r according to:

$$C(r) = \log_2 \det\left(I_r + \left(\frac{SNR(r)}{r}\right) * F^H H^H H F\right) \quad (3)$$

where C(r) denotes the estimated channel capacity, det denotes a determinant operation, $I_r$ denotes an r*r identity matrix, F denotes a precoding matrix, H denotes a channel matrix and $(\ )^H$ denotes Hermitian transpose.

Then, the terminal device can select from the plurality of candidate ranks, one rank having the highest channel capacity.

At block 140, an RI indicating the selected rank is transmitted to the network device.

Optionally, a CQI indicating the SNR(r) calculated for the selected rank can also be transmitted to the network device.

Figure 2:
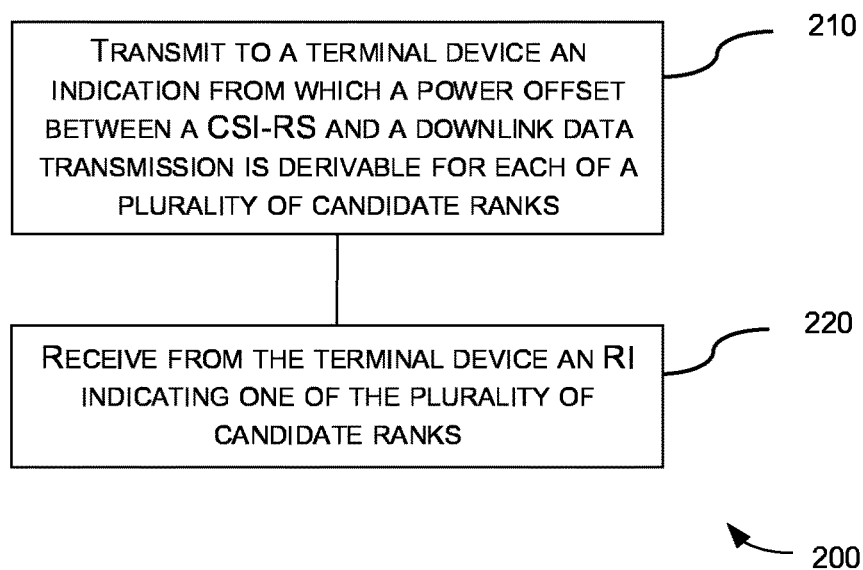
FIG. 2 is a flowchart illustrating a method in a network device for facilitating CSI feedback according to an embodiment of the present disclosure.

FIG. 2 is a flowchart illustrating a method 200 for facilitating CSI feedback according to an embodiment of the present disclosure. The method 200 can be performed at a network device.

At block 210, an indication is transmitted to a terminal device. From the indication, a power offset between a CSI-RS and a downlink data transmission is derivable for each of a plurality of candidate ranks.

In an example, the indication can indicate the respective power offsets for the plurality of candidate ranks. Alternatively, the indication can indicate a first power offset between a CSI-RS and a downlink data transmission for one of the plurality of candidate ranks and a power offset adjustment value. For the indication, reference can be made to the method 100 as described above in connection with FIG. 1 and details thereof will be omitted here.

At block 220, an RI indicating one of the plurality of candidate ranks is received from the terminal device.

Then, the network device can determine a downlink data transmission power based on the RI to meet an EIRP limit, e.g., according to Equation (1).

While the above embodiments and examples have been described in the context of unlicensed band operations subject to the EIRP limit, it can be appreciated that the principle of the present disclosure is also applicable to any other scenarios in which the maximum downlink transmission power is dependent to the transmission rank due to a transmission power limit.

Figure 3:
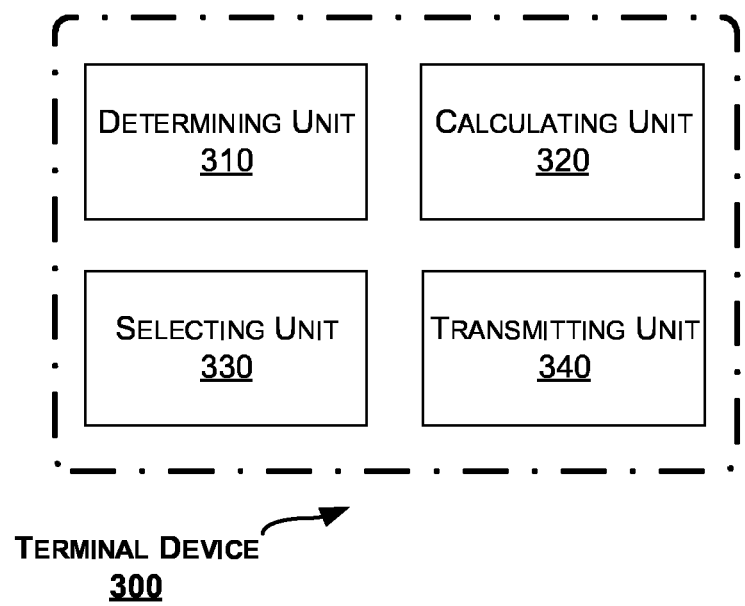
FIG. 3 is a block diagram of a terminal device according to an embodiment of the present disclosure.

Correspondingly to the method 100 as described above, a terminal device is provided. FIG. 3 is a block diagram of a terminal device 300 according to an embodiment of the present disclosure.

As shown in FIG. 3, the terminal device 300 includes a determining unit 310 configured to determine, for each of a plurality of candidate ranks, a power offset between a CSI-RS and a downlink data transmission. The terminal device 300 further includes a calculating unit 320 configured to calculate, for each of the plurality of candidate ranks, an SNR of the downlink data transmission based on the power offset determined for the corresponding candidate rank. The terminal device 300 further includes a selecting unit 330 configured to select a rank from the plurality of candidate ranks based on the respective SNRs calculated for the plurality of candidate ranks. The terminal device 300 further includes a transmitting unit 340 configured to transmit an RI indicating the selected rank to a network device.

In an embodiment, the terminal device 300 can further include a receiving unit configured to receive from the network device an indication of the respective power offsets for the plurality of candidate ranks. The determining unit 310 can be configured to determine the power offset for each of the plurality of candidate ranks from the indication.

In an embodiment, the terminal device 300 can further include a receiving unit configured to receive from the network device an indication of a first power offset between a CSI-RS and a downlink data transmission for one of the plurality of candidate ranks and a power offset adjustment value. The determining unit 310 can be configured to determine the power offset for each of the plurality of candidate ranks based on the first power offset and the power offset adjustment value.

In an embodiment, the determining unit 310 can be configured to estimate a beamforming gain for each of the plurality of candidate ranks; and determine the power offset for each of the plurality of candidate ranks based on the beamforming gain estimated for the corresponding candidate rank.

In an embodiment, the selecting unit 330 can be configured to select, from the plurality of candidate ranks, the highest one among the ranks for each of which the calculated SNR is higher than a predefined threshold for the corresponding rank.

In an embodiment, the respective predefined thresholds for the plurality of candidate ranks can be the same. Alternatively, the plurality of candidate ranks can include a first candidate rank and a second candidate rank higher than the first candidate rank, and the predefined threshold for the second candidate rank can be larger than the predefined threshold for the first candidate rank.

In an embodiment, the selecting unit 330 can be configured to estimate, for each of the plurality of candidate ranks, a channel capacity based on the SNR calculated for the corresponding rank; and select, from the plurality of candidate ranks, one rank having the highest channel capacity.

In an embodiment, the transmitting unit 340 can further be configured to transmit a CQI indicating the SNR calculated for the selected rank to the network device.

The units 310~340 can be configured to can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 4:
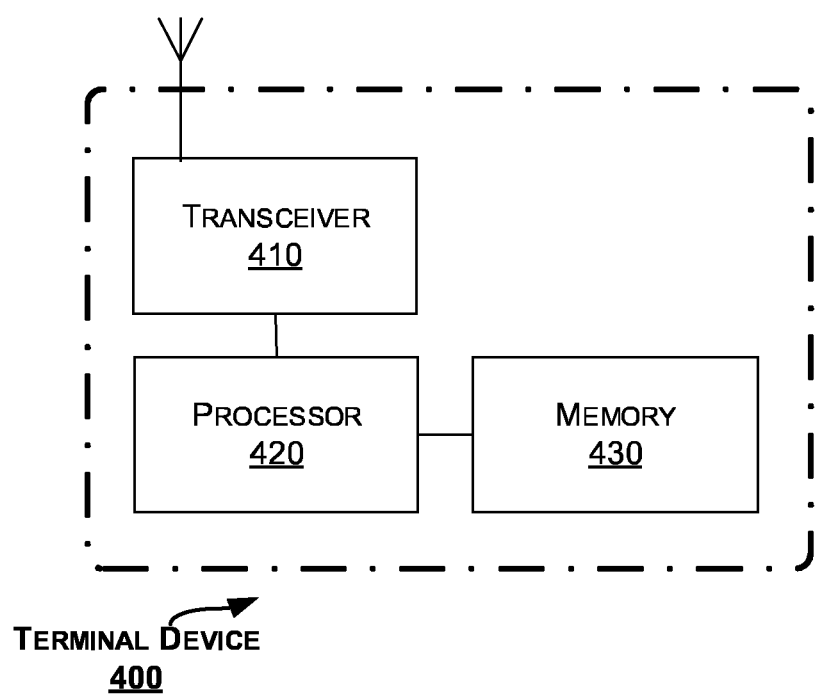
FIG. 4 is a block diagram of a terminal device according to another embodiment of the present disclosure.

FIG. 4 is a block diagram of a terminal device 400 according to another embodiment of the present disclosure.

The terminal device 400 includes a transceiver 410, a processor 420 and a memory 430. The memory 430 contains instructions executable by the processor 420 whereby the terminal device 400 is operative to perform the actions, e.g., of the procedure described earlier in conjunction with FIG. 1. Particularly, the memory 430 contains instructions executable by the processor 420 whereby the terminal device 400 is operative to: determine, for each of a plurality of candidate ranks, a power offset between a CSI-RS and a downlink data transmission; calculate, for each of the plurality of candidate ranks, an SNR of the downlink data transmission based on the power offset determined for the corresponding candidate rank; select a rank from the plurality of candidate ranks based on the respective SNRs calculated for the plurality of candidate ranks; and transmit an RI indicating the selected rank to a network device.

In an embodiment, the memory 430 can further contain instructions executable by the processor 420 whereby the terminal device 400 is operative to: receive from the network device an indication of the respective power offsets for the plurality of candidate ranks. The power offset for each of the plurality of candidate ranks can be determined from the indication.

In an embodiment, the memory 430 can further contain instructions executable by the processor 420 whereby the terminal device 400 is operative to: receive from the network device an indication of a first power offset between a CSI-RS and a downlink data transmission for one of the plurality of candidate ranks and a power offset adjustment value. The operation of determining can include: determining the power offset for each of the plurality of candidate ranks based on the first power offset and the power offset adjustment value.

In an embodiment, the operation of determining can include: estimating a beamforming gain for each of the plurality of candidate ranks; and determining the power offset for each of the plurality of candidate ranks based on the beamforming gain estimated for the corresponding candidate rank.

In an embodiment, the operation of selecting can include: selecting, from the plurality of candidate ranks, the highest one among the ranks for each of which the calculated SNR is higher than a predefined threshold for the corresponding rank.

In an embodiment, the respective predefined thresholds for the plurality of candidate ranks can be the same. Alternatively, the plurality of candidate ranks can include a first candidate rank and a second candidate rank higher than the first candidate rank, and the predefined threshold for the second candidate rank can be larger than the predefined threshold for the first candidate rank.

In an embodiment, the operation of selecting can include: estimating, for each of the plurality of candidate ranks, a channel capacity based on the SNR calculated for the corresponding rank; and selecting, from the plurality of candidate ranks, one rank having the highest channel capacity.

In an embodiment, the memory 430 can further contain instructions executable by the processor 420 whereby the terminal device 400 is operative to: transmit a CQI indicating the SNR calculated for the selected rank to the network device.

Figure 5:
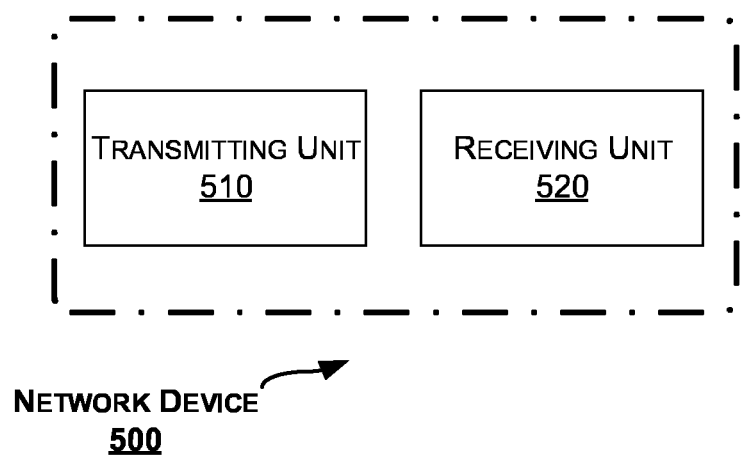
FIG. 5 is a block diagram of a network device according to an embodiment of the present disclosure.

Correspondingly to the method 200 as described above, a network device is provided. FIG. 5 is a block diagram of a network device 500 according to an embodiment of the present disclosure.

As shown in FIG. 5, the network device 500 includes a transmitting unit 510 configured to transmit to a terminal device an indication from which a power offset between a CSI-RS and a downlink data transmission is derivable for each of a plurality of candidate ranks. The network device 500 further includes a receiving unit 520 configured to receive from the terminal device an RI indicating one of the plurality of candidate ranks.

In an embodiment, the indication can indicate the respective power offsets for the plurality of candidate ranks.

In an embodiment, the indication can indicate a first power offset between a CSI-RS and a downlink data transmission for one of the plurality of candidate ranks and a power offset adjustment value.

In an embodiment, the network device 500 can further include a determining unit configured to determine a downlink data transmission power based on the RI to meet an EIRP limit.

The units 510~520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 6:
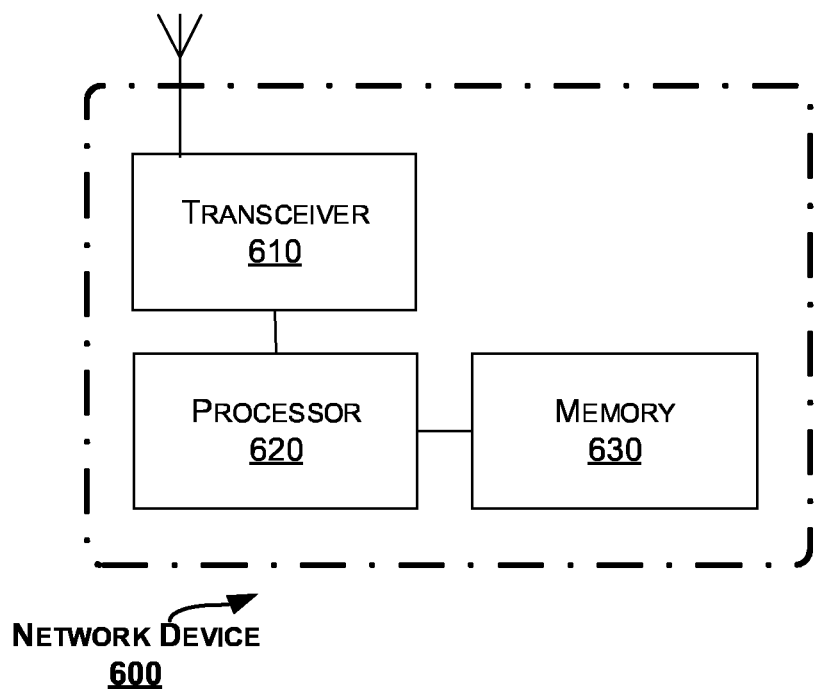
FIG. 6 is a block diagram of a network device according to another embodiment of the present disclosure.

FIG. 6 is a block diagram of a network device 600 according to another embodiment of the present disclosure.

The network device 600 includes a transceiver 610, a processor 620 and a memory 630. The memory 630 contains instructions executable by the processor 620 whereby the network device 600 is operative to perform the actions, e.g., of the procedure described earlier in conjunction with FIG. 2. Particularly, the memory 630 contains instructions executable by the processor 620 whereby the network device 600 is operative to: transmit to a terminal device an indication from which a power offset between a CSI-RS and a downlink data transmission is derivable for each of a plurality of candidate ranks; and receive from the terminal device an RI indicating one of the plurality of candidate ranks.

In an embodiment, the indication can indicate the respective power offsets for the plurality of candidate ranks.

In an embodiment, the indication can indicate a first power offset between a CSI-RS and a downlink data transmission for one of the plurality of candidate ranks and a power offset adjustment value.

In an embodiment, the memory 630 can further contain instructions executable by the processor 620 whereby the network device 600 is operative to determine a downlink data transmission power based on the RI to meet an EIRP limit.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 420 causes the terminal device 400 to perform the actions, e.g., of the procedure described earlier in conjunction with FIG. 1; or code/computer readable instructions, which when executed by the processor 620 causes the network device 600 to perform the actions, e.g., of the procedure described earlier in conjunction with FIG. 2.

The computer program product may be configured as a computer program code structured in computer program modules. The computer program modules could essentially perform the actions of the flow illustrated in FIG. 1 or 2.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 7:
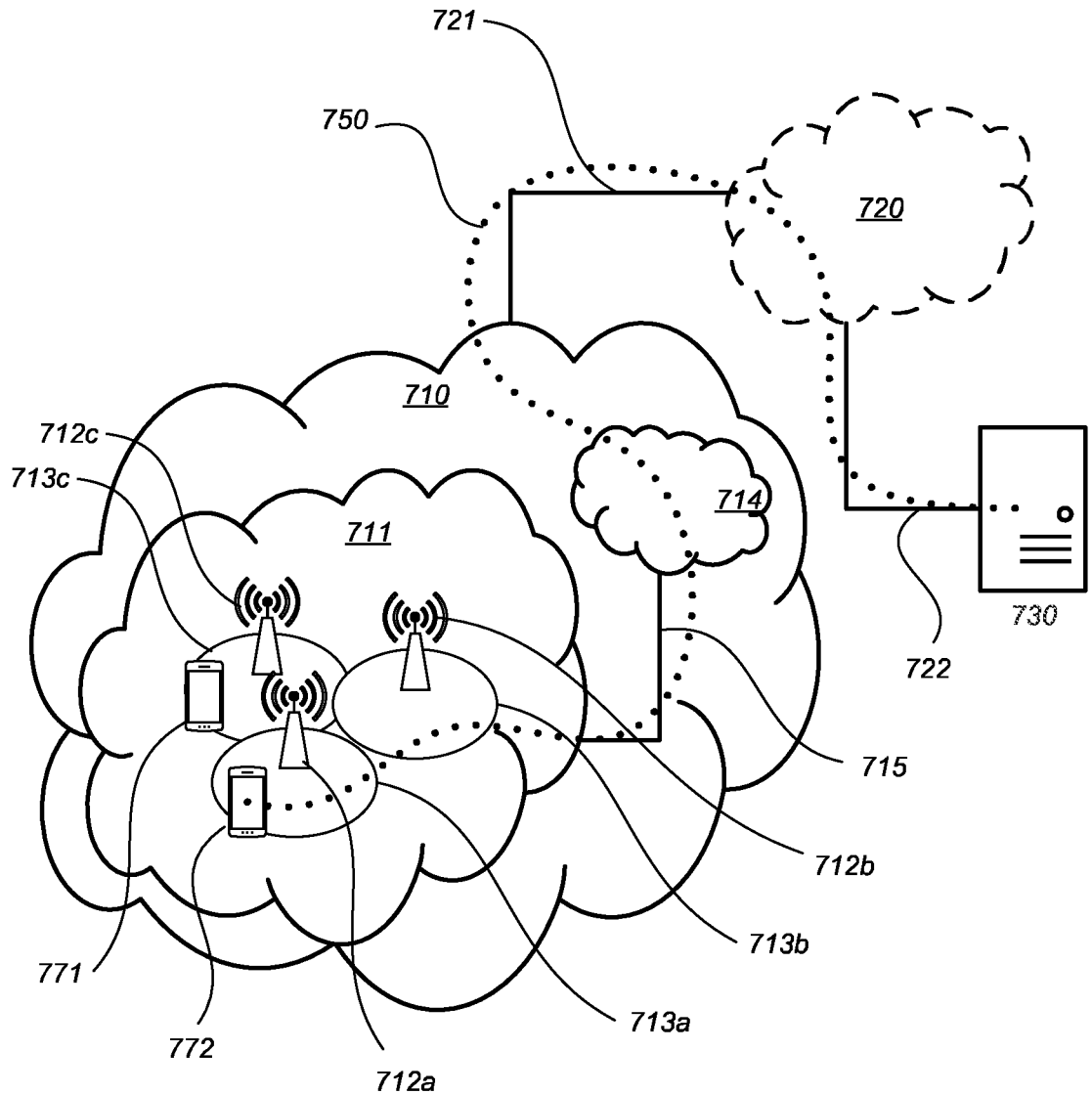
FIG. 7 schematically illustrates a telecommunication network connected via an intermediate network to a host computer.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712*a*, 712*b*, 712*c*, such as NBs, eNBs, gNBs or other types of wireless access points, each defining a corresponding coverage area 713*a*, 713*b*, 713*c*. Each base station 712*a*, 712*b*, 712*c* is connectable to the core network 714 over a wired or wireless connection 715. A first user equipment (UE) 771 located in coverage area 713*c* is configured to wirelessly connect to, or be paged by, the corresponding base station 712*c*. A second UE 772 in coverage area 713*a* is wirelessly connectable to the corresponding base station 712*a*. While a plurality of UEs 771, 772 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 771, 772 and the host computer 730. The connectivity may be described as an over-the-top (OTT) connection 750. The host computer 730 and the connected UEs 771, 772 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 771. Similarly, the base station 712 need not be aware of the future routing of an outgoing uplink communication originating from the UE 771 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection. The processing circuitry 828 is configured to perform the steps of the method shown in FIG. 2.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The processing circuitry 838 is figured to perform the steps of the method shown in FIG. 1. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
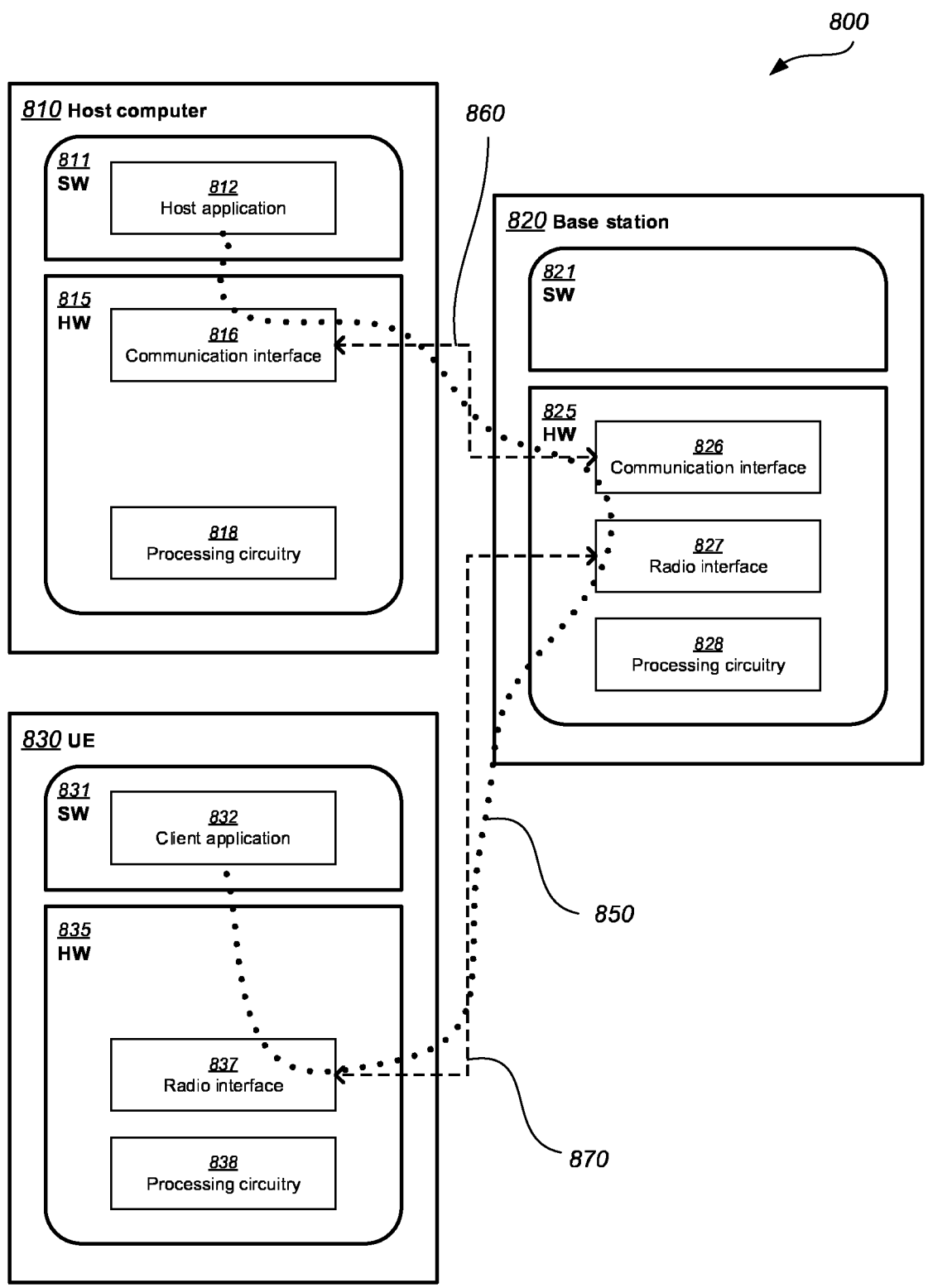
FIG. 8 is a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712*a*, 712*b*, 712*c* and one of the UEs 771, 772 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the data rate and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for Channel State Information, CSI, feedback, the method comprising:
   determining, for each of a plurality of candidate ranks, a power offset between a CSI Reference Signal, CSI-RS, and a downlink data transmission, the determining including estimating a beamforming gain for each of the plurality of candidate ranks and determining the power offset for each of the plurality of candidate ranks based on the beamforming gain estimated for the corresponding candidate rank;
   calculating, for each of the plurality of candidate ranks, a Signal-to-Noise Ratio, SNR, of the downlink data transmission based on the power offset determined for the corresponding candidate rank;
   selecting a rank from the plurality of candidate ranks based on the respective SNRs calculated for the plurality of candidate ranks; and
   transmitting a Rank Indicator, RI, indicating the selected rank to a network device.

2. The method of claim 1, further comprising:
   receiving from the network device an indication of the respective power offsets for the plurality of candidate ranks, wherein the power offset for each of the plurality of candidate ranks is determined from the indication.

3. The method of claim 1, further comprising:
   receiving from the network device an indication of a first power offset between a CSI-RS and a downlink data transmission for one of the plurality of candidate ranks and a power offset adjustment value, wherein the determining comprises:
      determining the power offset for each of the plurality of candidate ranks based on the first power offset and the power offset adjustment value.

4. The method of claim 1, wherein the selecting comprises:
   selecting, from the plurality of candidate ranks, the highest one among the ranks for each of which the calculated SNR is higher than a predefined threshold for the corresponding candidate rank.

5. The method of claim 4, wherein one of:
   the respective predefined thresholds for the plurality of candidate ranks are same; and
   the plurality of candidate ranks comprises a first candidate rank and a second candidate rank higher than the first candidate rank, and the predefined threshold for the second candidate rank is larger than the predefined threshold for the first candidate rank.

6. The method of claim 1, wherein the selecting comprises:
   estimating, for each of the plurality of candidate ranks, a channel capacity based on the SNR calculated for the corresponding rank; and
   selecting, from the plurality of candidate ranks, one rank having the highest channel capacity.

7. The method of claim 1, further comprising:
   transmitting a Channel Quality Indicator, CQI, indicating the SNR calculated for the selected rank to the network device.

8. A terminal device, comprising:
a transceiver;
a processor; and
a memory, the memory comprising instructions executable by the processor to cause the terminal device to:
determine, for each of a plurality of candidate ranks, a power offset between a CSI Reference Signal, CSI-RS, and a downlink data transmission, the determining including estimating a beamforming gain for each of the plurality of candidate ranks and determining the power offset for each of the plurality of candidate ranks based on the beamforming gain estimated for the corresponding candidate rank;
calculate, for each of the plurality of candidate ranks, a Signal-to-Noise Ratio, SNR, of the downlink data transmission based on the power offset determined for the corresponding candidate rank;
select a rank from the plurality of candidate ranks based on the respective SNRs calculated for the plurality of candidate ranks; and
transmit a Rank Indicator, RI, indicating the selected rank to a network device.

9. The terminal device of claim 8, wherein the instructions executable by the processor further cause the terminal device to:
receive from the network device an indication of the respective power offsets for the plurality of candidate ranks, wherein the power offset for each of the plurality of candidate ranks is determined from the indication.

10. The terminal device of claim 8, wherein the instructions executable by the processor further cause the terminal device to:
receive from the network device an indication of a first power offset between a CSI-RS and a downlink data transmission for one of the plurality of candidate ranks and a power offset adjustment value, wherein the determining comprises:
determining the power offset for each of the plurality of candidate ranks based on the first power offset and the power offset adjustment value.

11. The terminal device of claim 8, wherein the selecting comprises:
selecting, from the plurality of candidate ranks, the highest one among the ranks for each of which the calculated SNR is higher than a predefined threshold for the corresponding candidate rank.

12. The terminal device of claim 11, wherein one of:
the respective predefined thresholds for the plurality of candidate ranks are same; and
the plurality of candidate ranks comprises a first candidate rank and a second candidate rank higher than the first candidate rank, and the predefined threshold for the second candidate rank is larger than the predefined threshold for the first candidate rank.

13. The terminal device of claim 8, wherein the selecting comprises:
estimating, for each of the plurality of candidate ranks, a channel capacity based on the SNR calculated for the corresponding rank; and
selecting, from the plurality of candidate ranks, one rank having the highest channel capacity.

14. A method in a network device for facilitating Channel State Information, CSI, feedback, the method comprising:
transmitting to a terminal device an indication from which a power offset between a CSI Reference Signal, CSI-RS, and a downlink data transmission is derivable for each of a plurality of candidate ranks, the power offset for each rank of the plurality of candidate ranks being based at least in part on an estimated beamforming gain for the rank; and
receiving from the terminal device a Rank Indicator, RI, indicating one of the plurality of candidate ranks.

15. The method of claim 14, wherein the indication indicates the respective power offsets for the plurality of candidate ranks.

16. The method of claim 14, wherein the indication indicates a first power offset between a CSI-RS and a downlink data transmission for one of the plurality of candidate ranks and a power offset adjustment value.

17. The method of claim 14, further comprising:
determining a downlink data transmission power based on the RI to meet an Effective Isotropic Radiated Power, EIRP, limit.

18. A network device, comprising:
a transceiver;
a processor; and
a memory, the memory comprising instructions executable by the processor to configure the network device to:
transmit to a terminal device an indication from which a power offset between a CSI Reference Signal, CSI-RS, and a downlink data transmission is derivable for each of a plurality of candidate ranks, the power offset for each rank of the plurality of candidate ranks being based at least in part on an estimated beamforming gain for the rank; and
receive from the terminal device a Rank Indicator, RI, indicating one of the plurality of candidate ranks.

* * * * *